(12) United States Patent
Erickson

(10) Patent No.: US 8,033,766 B2
(45) Date of Patent: Oct. 11, 2011

(54) TOOL HOLDER WITH BALL CLAMPING MECHANISM

(75) Inventor: Robert Alfred Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 824 days.

(21) Appl. No.: 12/118,048

(22) Filed: May 9, 2008

(65) Prior Publication Data
US 2009/0279973 A1    Nov. 12, 2009

(51) Int. Cl.
*B23B 31/107* (2006.01)
(52) U.S. Cl. .......................................... 409/234; 279/67
(58) Field of Classification Search .............. 279/66, 279/67, 112, 8; 409/234, 231, 232, 233; 408/239 R, 238, 240
See application file for complete search history.

(56) References Cited

U.S. PATENT DOCUMENTS

| | | | | |
|---|---|---|---|---|
| 2,485,799 | A | * | 10/1949 | Woytych .......................... 279/76 |
| 2,684,249 | A | * | 7/1954 | Woytych .......................... 279/76 |
| 4,131,256 | A | | 12/1978 | F'Geppert |
| 4,412,767 | A | * | 11/1983 | Schmid et al. ................. 409/234 |
| 4,729,702 | A | * | 3/1988 | Kelm ............................. 409/234 |
| 4,799,837 | A | * | 1/1989 | Vollmer .......................... 409/232 |
| 4,919,574 | A | * | 4/1990 | Samyn ........................... 409/219 |
| 5,697,740 | A | | 12/1997 | Von Haas et al. |
| 5,957,467 | A | * | 9/1999 | Hornung ......................... 279/49 |
| 6,280,125 | B1 | | 8/2001 | Boisvert |
| 6,415,696 | B1 | | 7/2002 | Erickson et al. |
| 6,543,318 | B1 | | 4/2003 | Erickson |
| 6,786,119 | B1 | | 9/2004 | Erickson et al. |
| 7,240,594 | B2 | | 7/2007 | Erickson et al. |
| 7,284,938 | B1 | | 10/2007 | Miyazawa |

FOREIGN PATENT DOCUMENTS

| | | |
|---|---|---|
| EP | 1543904 A2 | 6/2005 |
| JP | 2002326105 | 11/2002 |
| WO | 9405450 A1 | 3/1994 |

\* cited by examiner

*Primary Examiner* — Daniel Howell
*Assistant Examiner* — Paul M Janeski
(74) *Attorney, Agent, or Firm* — Larry R. Meenan

(57) ABSTRACT

A tool holder includes a body, a cutting head having a cutting end portion and a tapered end portion, a retention knob located at the tapered end portion of the cutting head, and a ball clamping mechanism received in an aperture of the body. The ball clamping mechanism includes an upper clamp, a lower clamp, and a double-ended clamp screw threaded onto the upper and lower clamps. Rotation of the clamp screw in a one direction causes the upper clamp and the lower clamp to move toward each other and engage the retention knob to place the tool holder in a locked position, and rotation of the clamp screw in an opposite direction causes the upper clamp and the lower clamp to move away from each other such that the upper and lower clamps no longer engage the retention knob to place the tool holder in a unlocked position.

19 Claims, 13 Drawing Sheets

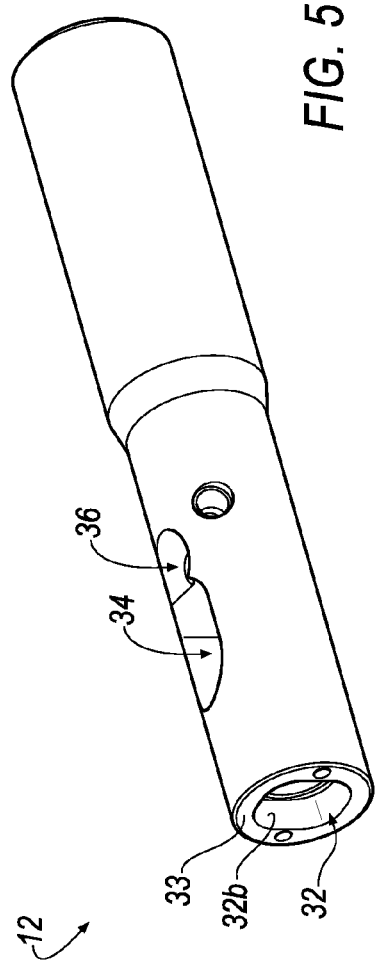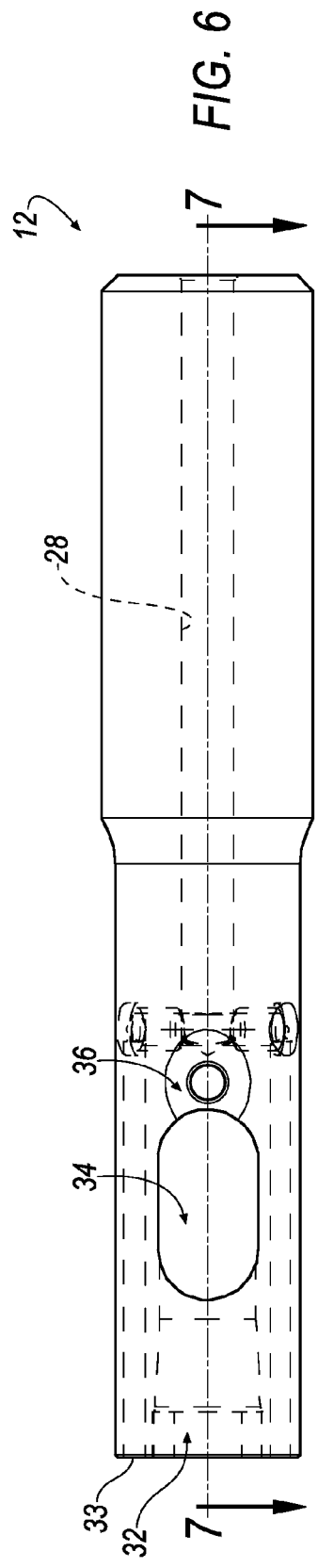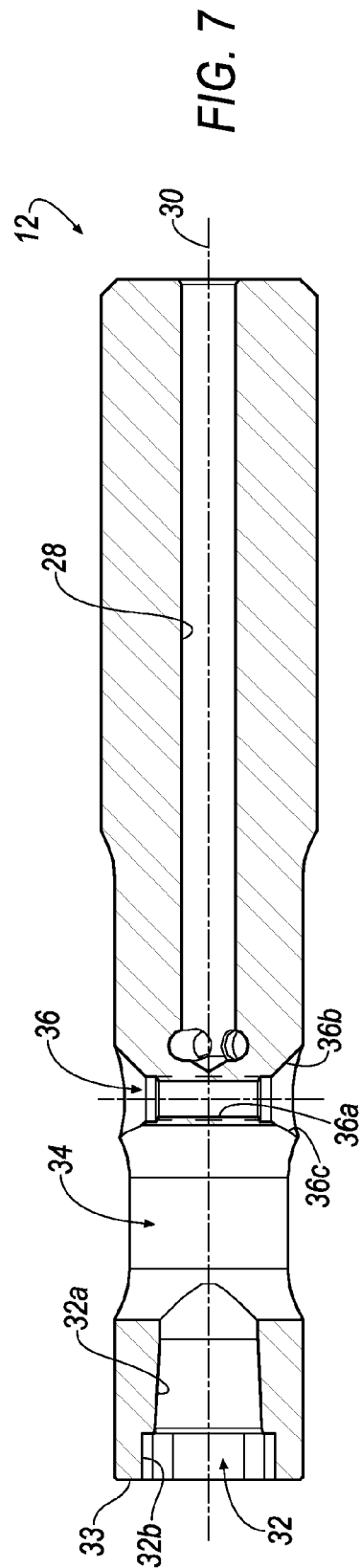

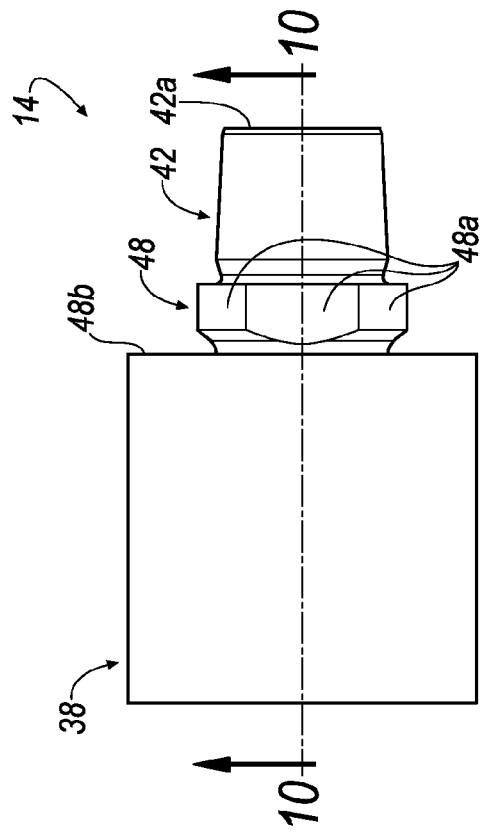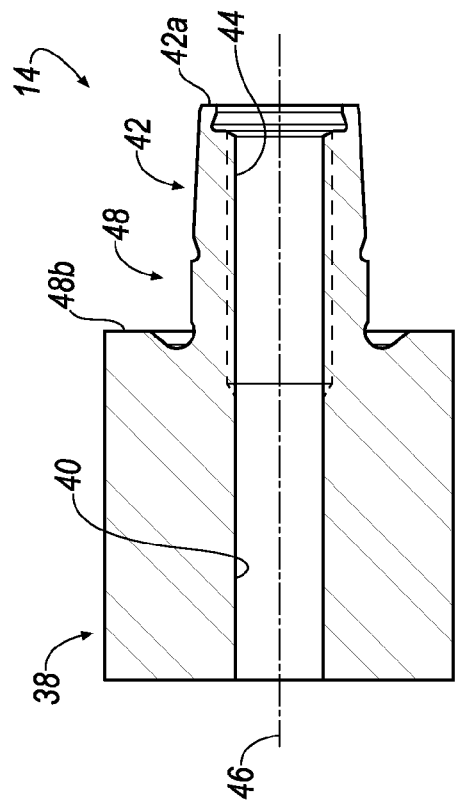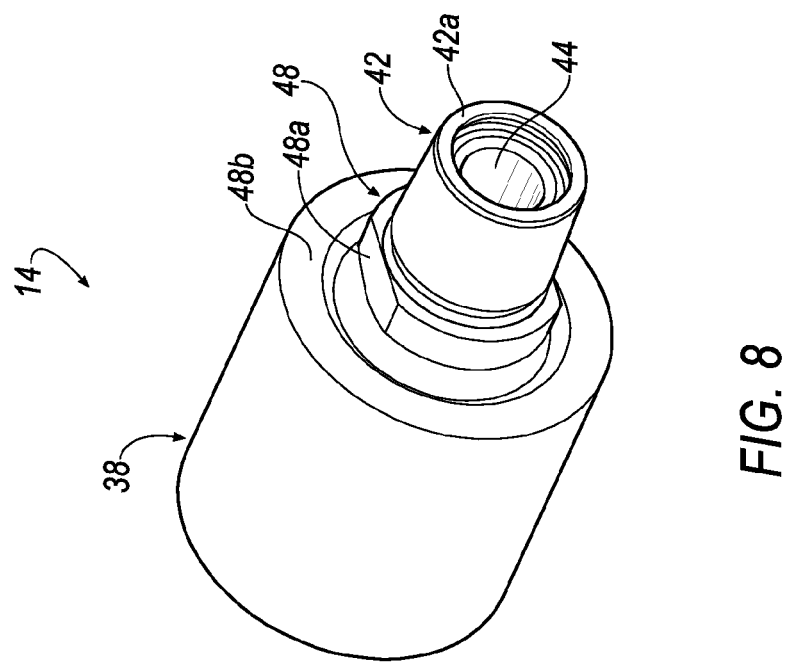
FIG. 9
FIG. 10
FIG. 8

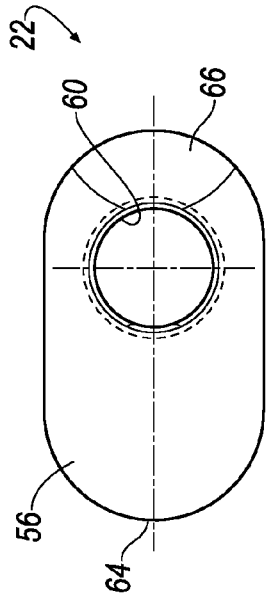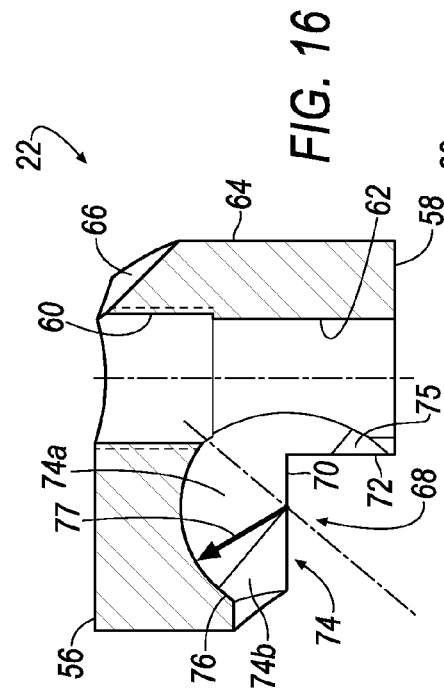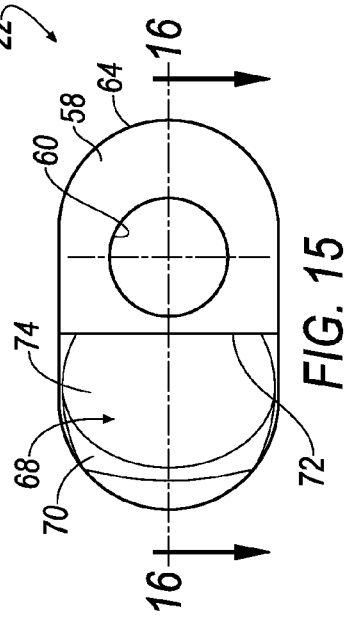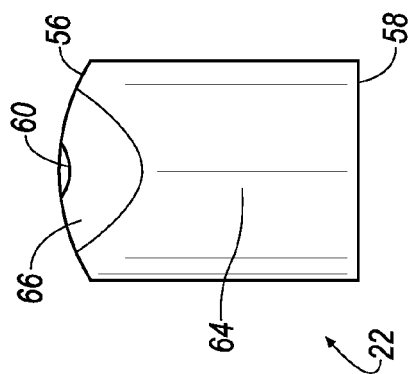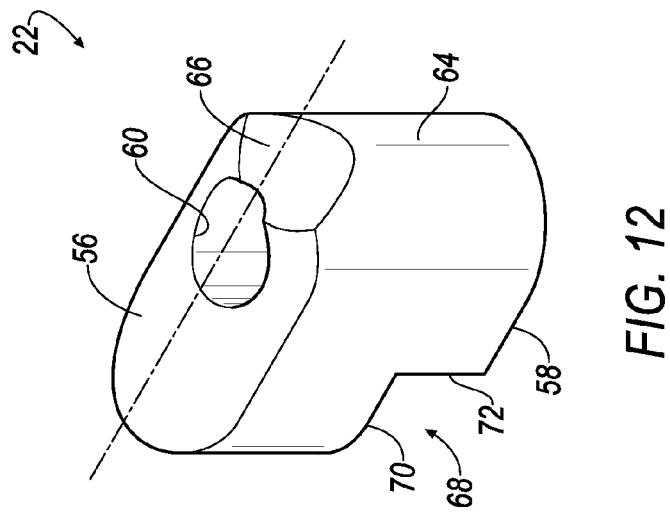

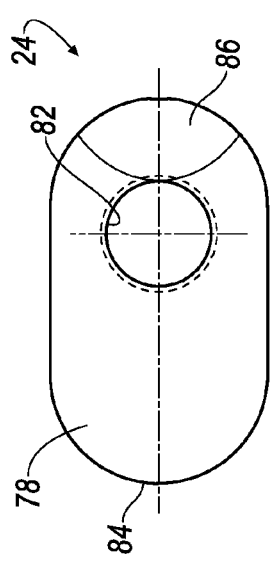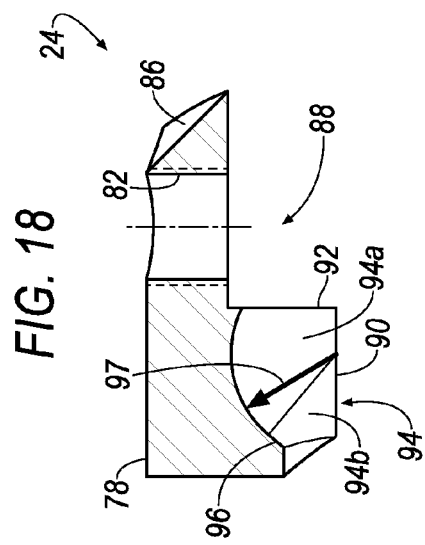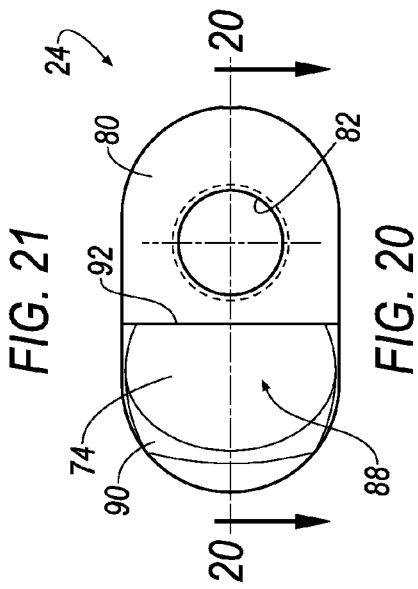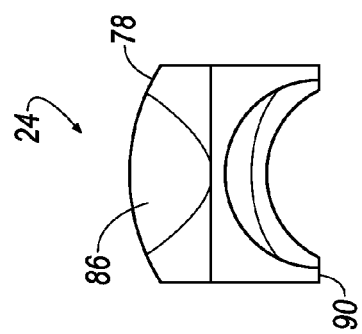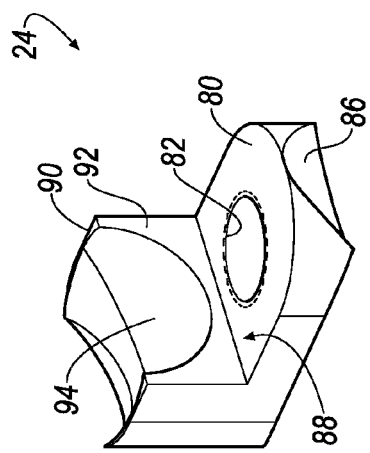

TOOL HOLDER WITH BALL CLAMPING MECHANISM

BACKGROUND OF THE INVENTION

The invention relates to a tool clamping mechanism, and in particular to a tool clamping mechanism having two clamping jaws connected by a double-ended screw and held in an axial location by slots in the tool holder body.

Coupling systems for interconnecting machine tools are well known in the prior art. Such coupling systems include a hollow, frustro-conical male component that forms part of the tool which mates with a frustro-conical opening in a female component. The female component is typically part of a spindle for rotating the tool. The taper of both the frustro-conical components often has a slope of about 1 to 10 with respect to the longitudinal axis of the tool. Such a slope provides a rigid, on-center interference coupling when the components are pulled together by means of a clamping mechanism disposed in the interior of the female opening.

There are presently a variety of mechanisms for clamping together the frustro-conical male and female components of prior art coupling systems. In some of these mechanisms, the female component on the toolholder includes radially movable locking balls for engaging complementarily-shaped socket openings in the walls of the male component. When moved radially outwardly, the locking balls function to secure and pull in the frustro-conical tool shank into the frustro-conical opening in the toolholder. An axially slidable bolt having cam surfaces radially forces the locking balls outwardly into the socket openings. In other types of mechanisms, the female opening includes a radially expandable locking plunger which is extendable into the hollow interior of the frustro-conical male component. The locking plunger may include two or more radially movable fingers that engage openings in the wall of the frustro-conically shaped male component in order to forcefully wedge the male component of the tool into the female component of the toolholder.

While both of these general types of prior art coupling systems have shown themselves to be effective for their intended purpose, conventional coupling systems tend to put force on the body and possibly cause misalignment between the cutting head and the body, particularly for small cutters. Therefore, it would be desirable to design a coupling system that minimizes force on the body, and therefore minimizing misalignment between the cutting head and the body.

BRIEF SUMMARY OF THE INVENTION

Briefly, according to this invention, there is provided a tool holder comprising a body having a ball clamping mechanism aperture; a cutting head having a cutting end portion, a tapered end portion, and a middle portion located between the cutting end and the tapered end portion; a retention knob located at the tapered end portion of the cutting head, the retention knob including a generally spherical end portion at least partially disposed within the body, the generally spherical end portion including an upper spherical clamp surface and a lower spherical clamp surface; and a ball clamping mechanism received in the ball clamping mechanism aperture of the body. The ball clamping mechanism comprises an upper clamp having an upper clamp cavity capable of receiving the generally spherical end portion of the retention knob, the upper clamp cavity including a generally spherical upper clamp cavity portion and a generally cylindrical upper clamp cavity portion, a portion of the generally cylindrical upper clamp cavity portion defining a generally cylindrical upper clamp surface; a lower clamp having a lower clamp cavity capable of receiving the generally spherical end portion of the retention knob, the lower clamp cavity including a generally spherical lower clamp cavity portion and a generally cylindrical lower clamp cavity portion, a portion of the generally cylindrical lower clamp cavity portion defining a generally cylindrical lower clamp surface; and a double-ended clamp screw for threadingly receiving the upper and lower clamps. Rotation of the double-ended clamp screw in a first direction causes the generally cylindrical upper and lower clamp surfaces of the upper and lower clamps to move toward each other and engage the generally spherical upper and lower spherical clamp surfaces of the retention knob, respectively. The generally cylindrical upper and lower contact surfaces elastically deform during engagement with the generally spherical upper and lower clamp surfaces of the retention knob to form a lenticular contact area and securely hold the cutting head in face contact with the body and place the tool holder in a locked position.

In another embodiment, a tool holder comprises a body having a ball clamping mechanism aperture; a cutting head having a cutting end portion, a tapered end portion, and a middle portion located between the cutting end and the tapered end portion; a retention knob located at the tapered end portion of the cutting head, the retention knob including a generally spherical end portion at least partially disposed within the body, the generally spherical end portion including a slot, an upper spherical clamp surface and a lower spherical clamp surface; and a ball clamping mechanism received in the ball clamping mechanism aperture of the body. The ball clamping mechanism comprises an upper clamp having an upper clamp cavity capable of receiving the generally spherical end portion of the retention knob, the upper clamp cavity including a generally spherical upper clamp cavity portion and a generally cylindrical upper clamp cavity portion, a portion of the generally cylindrical upper clamp cavity portion defining a generally cylindrical upper clamp surface; a lower clamp having a lower clamp cavity capable of receiving the generally spherical end portion of the retention knob, the lower clamp cavity including a generally spherical lower clamp cavity portion and a generally cylindrical lower clamp cavity portion, a portion of the generally cylindrical lower clamp cavity portion defining a generally cylindrical lower clamp surface; and a double-ended clamp screw for threadingly receiving the upper and lower clamps, the double-ended clamp screw including a middle portion disposed within the slot of the retention knob. Rotation of the double-ended clamp screw in a first direction causes the generally cylindrical upper and lower clamp surfaces of the upper and lower clamps to move toward each other and engage the generally spherical upper and lower spherical clamp surfaces of the retention knob, respectively. The generally cylindrical upper and lower contact surfaces elastically deform during engagement with the generally spherical upper and lower clamp surfaces of the retention knob to form a lenticular contact area and securely hold the cutting head in face contact with the body and place the tool holder in a locked position.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a perspective view of a body of the tool holder of FIG. 1 according to an embodiment of the invention;

FIG. 6 is a top view of the body of the tool holder of FIG. 5;

FIG. 7 is a cross-sectional view of the body taken along line 7-7 of FIG. 6;

FIG. 8 is a perspective view of a cutting head of the tool holder of FIG. 1 according to an embodiment of the invention;

FIG. 9 is a side view of the cutting head of FIG. 8;

FIG. 10 is a cross-sectional view of the cutting head taken along line 10-10 of FIG. 9;

FIG. 12 is a perspective of an upper clamp of the tool holder of FIG. 1 according to an embodiment of the invention;

FIG. 13 is a top view of the upper clamp of FIG. 12;

FIG. 14 is an end view of the upper clamp of FIG. 12;

FIG. 15 is a bottom view of the upper clamp of FIG. 12;

FIG. 16 is a cross-sectional view of the upper clamp taken along line 16-16 of FIG. 15;

FIG. 17 is a perspective of a lower clamp of the tool holder of FIG. 1 according to an embodiment of the invention;

FIG. 18 is a bottom view of the lower clamp of FIG. 17;

FIG. 19 is an end view of the lower clamp of FIG. 17;

FIG. 20 is a top view of the lower clamp of FIG. 17;

FIG. 21 is a cross-sectional view of the lower clamp taken along line 21-21 of FIG. 20;

DETAILED DESCRIPTION OF THE INVENTION

Figure 1:
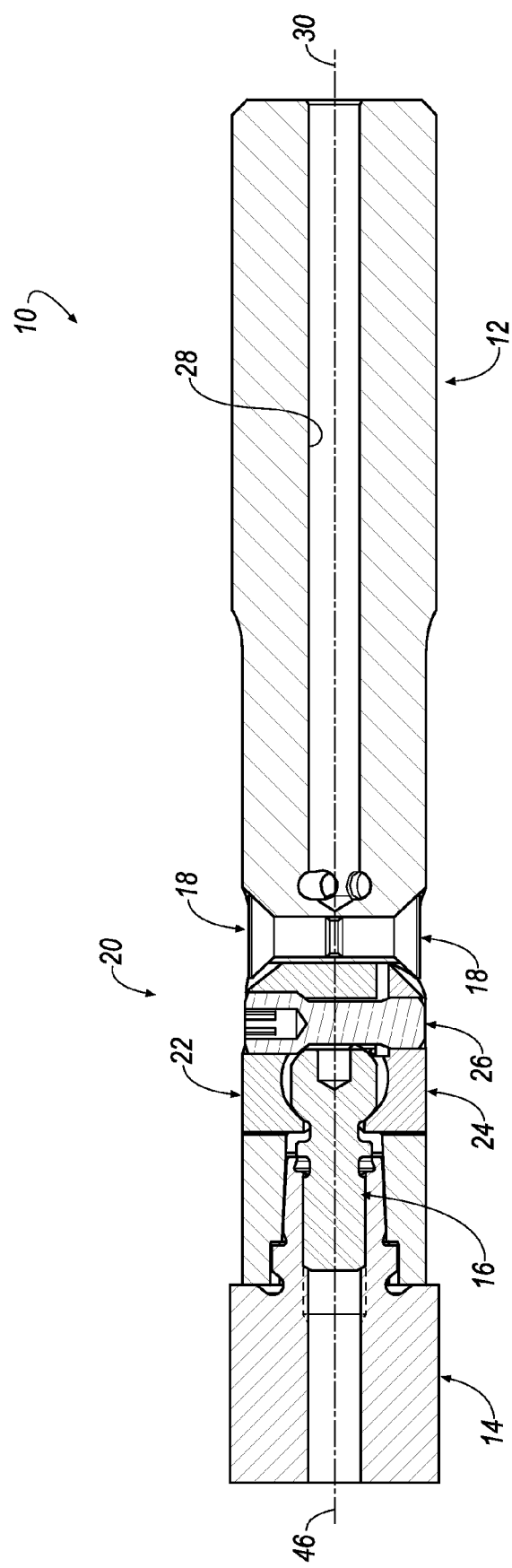
FIG. 1 is a cross-sectional view of a tool holder with a ball clamping mechanism in the locked position according to an embodiment of the invention.
Figure 2:
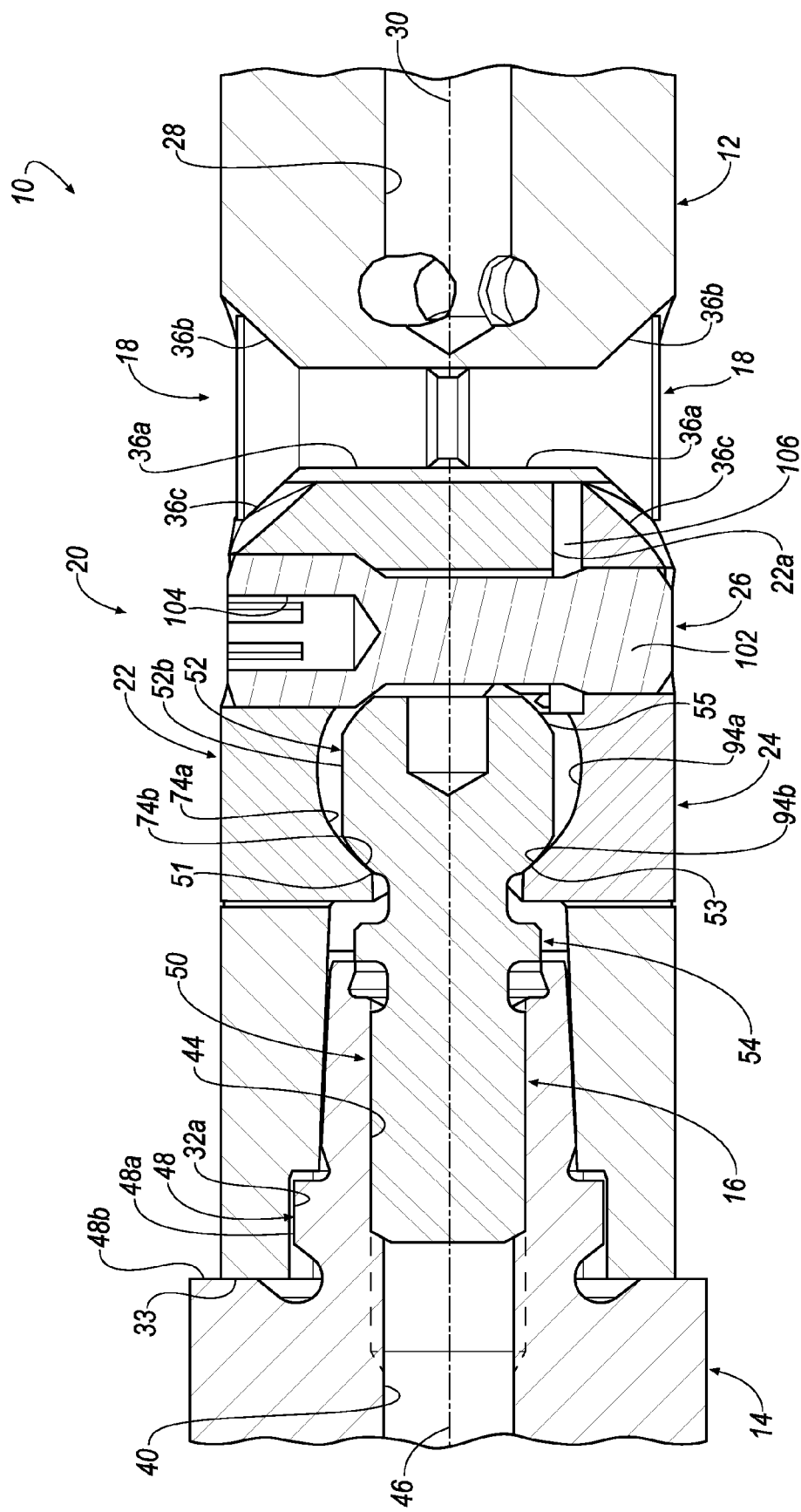
FIG. 2 is an enlarged view of the ball clamping mechanism of FIG. 1 in the locked position.

Referring now to FIGS. 1-4, a tool holder is shown generally at 10 according to an embodiment of the invention. The tool holder 10 includes a generally cylindrical, annular body 12, a cutting head 14, a retention knob 16, radial stops 18, and a ball clamping mechanism, shown generally at 20. The ball clamping mechanism 20 includes an upper clamp 22, a lower clamp 24 and a double-ended clamp screw 26. In FIGS. 1 and 2, the tool holder 10 is shown in the locked position, and in FIGS. 3 and 4, the tool holder 10 is shown in the unlocked position.

Referring now to FIGS. 5-7, the body 12 is annular and generally cylindrical in shape and includes a cavity 28 for coolant at one end that is centrally located with respect to a longitudinal axis 30 of the body 12. The other end of the body 12 includes a cutting head receiving receptacle 32 with a slightly larger diameter than the cavity 28 for receiving the cutting head 14 and retention knob 16. In one embodiment, one end of the receptacle 32 has an included taper angle of about 5 degrees, 44 minutes (1:10). The end of the receptacle 32 is in communication with a generally elliptical, radially-extending ball clamping mechanism aperture 34. A ball clamping mechanism aperture 34 is substantially perpendicular and is substantially mirror symmetric with respect to the longitudinal axis 30 of the body 12. The other end 32b of the cutting head receiving receptacle 32 interacts with the cutting head 14 to provide an anti-rotation feature of the tool holder 10. One end of the body 12 proximate the cutting head 14 includes a flange contact surface 33 that contacts the cutting head 14 when the tool holder 10 is placed in the locked position.

The body 12 also includes a radially-extending screw aperture 36 that is substantially perpendicular to the longitudinal axis 30 of the body 12 (and substantially parallel with the ball clamping mechanism aperture 34). In one embodiment, the radial stops 18 comprise flat head screws that are threaded into a middle portion 36a of the screw aperture 36. Ends 36b of the screw aperture 36 are tapered to provide a seating surface for the flat head screws 18. It will be appreciated that the invention is not limited by the use of flat head screws as the radial stops 18, and that the invention can be practiced by using other similar means, such as pins, and the like. The screw aperture 36 is substantially mirror symmetric with respect to the longitudinal axis 30 of the body 12. In one embodiment, each end 36b is cone-shaped with an included angle of about ninety (90) degrees. A portion 36c of each end 36b is in communication with the ball clamping mechanism aperture 34. In this manner, a portion of the flat head screws 18 are able to engage the upper and lower clamps 22, 24 and limit radial movement of the upper and lower clamps 22, 24. The ball clamping mechanism 20 can be removed from the ball clamping mechanism aperture 34 of the body 12 by removing one or both flat head screws 18.

Figure 25:
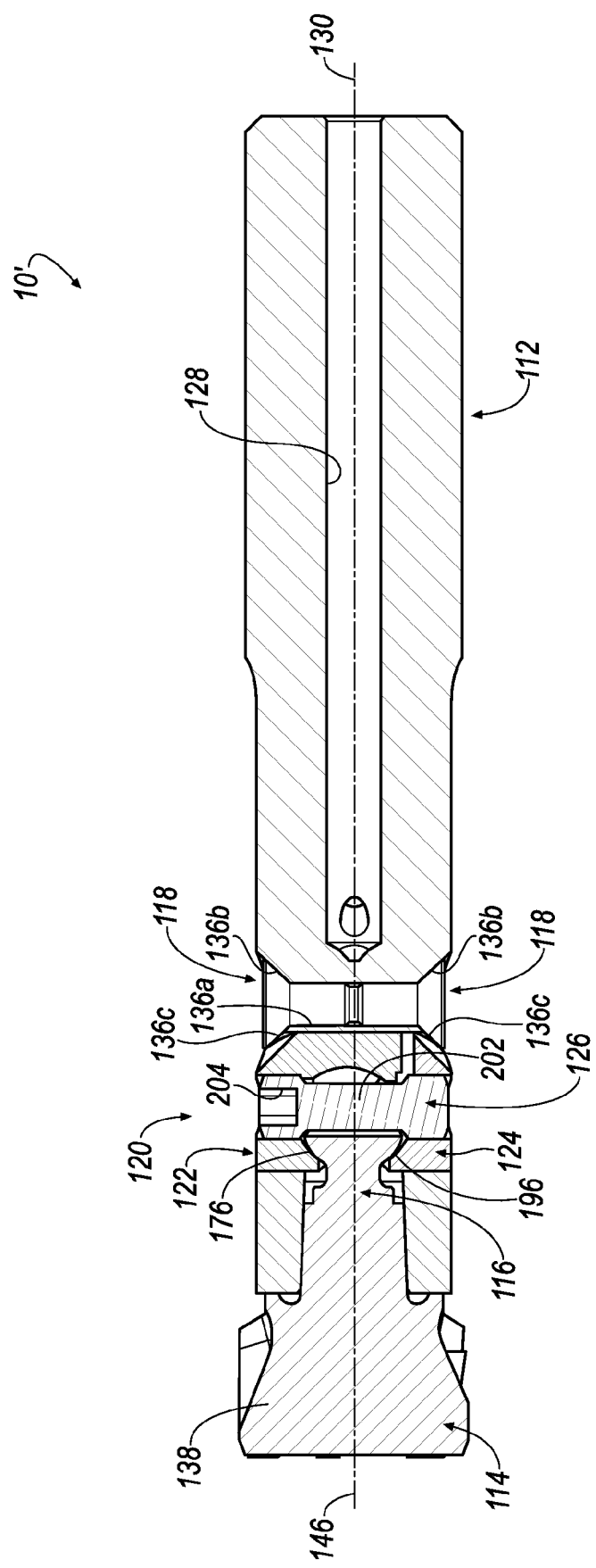
FIG. 25 is a cross-sectional view of a tool holder with a ball clamping mechanism in the locked position according to an alternate embodiment of the invention.
Figure 26:
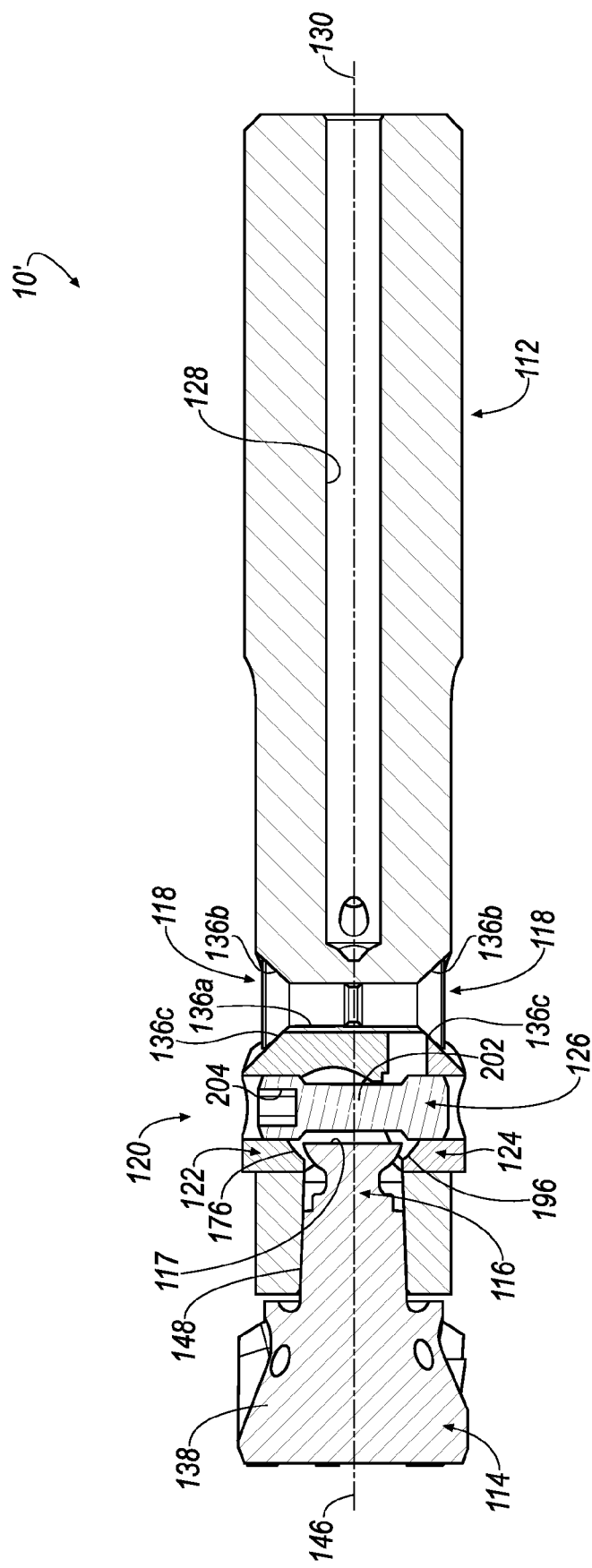
FIG. 26 is a cross-sectional view of the tool holder with the ball clamping mechanism of FIG. 25 in the unlocked position.

Referring now to FIGS. 8-10, the cutting head 14 is shown according to an embodiment of the invention. One end of the cutting head 14 includes a cutting end portion 38 that is generally cylindrical in shape and may have a central cavity 40 for receiving a cutting tool (not shown), if necessary. The cutting head 14 also includes a tapered end portion 42 at an opposite end and having an outer surface that is tapered in a similar fashion as the cutting head receiving receptacle 32 of the body 12. In an embodiment, the tapered end portion 42 has an included taper angle of about 5 degrees, 44 minutes (1:10). The tapered end portion 42 is generally annular having a threaded aperture 44 in communication with the central cavity 40. The threaded aperture 44 is capable of receiving the retention knob 16. However, it will be appreciated that the retention knob 16 can be integrally formed with the cutting head 14, as shown in FIGS. 25 and 26. In addition, in some embodiments, the central cavity 40 may be omitted. In the illustrated embodiment, the threaded aperture 44 and the central cavity 40 are substantially aligned with a central, longitudinal axis 46 of the cutting head 14.

The cutting head 14 includes a middle portion 48 with an anti-rotation feature 48a and a face contact surface 48b that contacts the flange contact surface 33 of the body 12 when the tool holder 10 is in the locked position. In the illustrated embodiment, the anti-rotation feature comprises two flats 48a that interact with a wall 32a of the cutting head receiving receptacle 32 of the body 12 to prevent rotation of the cutting head 14 with respect to the body 12. In the illustrated embodiment, the middle portion 48 has a pair of opposing flats 48a. However, the invention can be practiced with any desirable number of flats 48a that prevent rotation of the cutting head 14.

Figure 11:
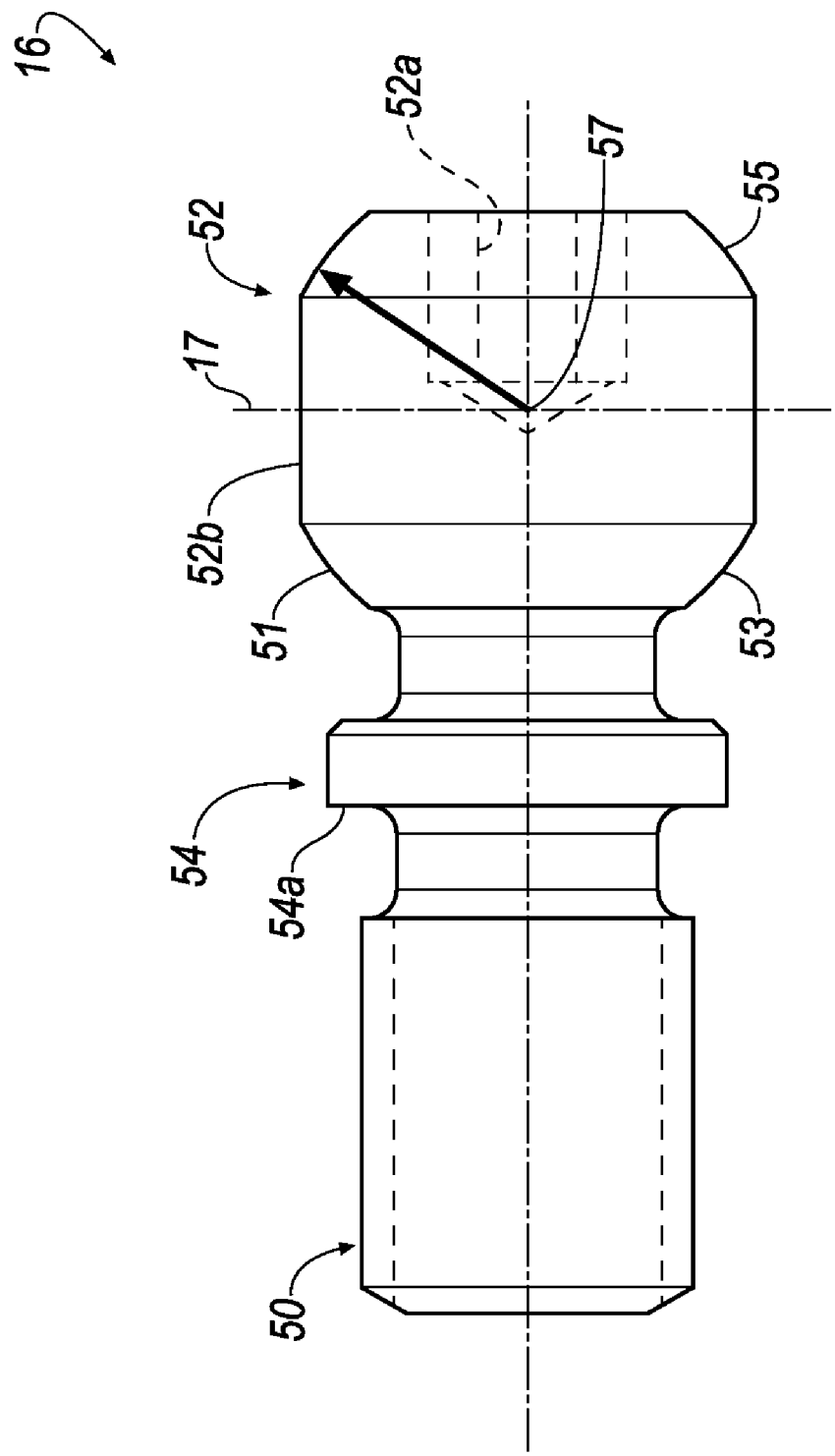
FIG. 11 is a side view of a retention knob of the tool holder of FIG. 1 according to an embodiment of the invention.

Referring now to FIG. 11, the retention knob 16 is shown according to an embodiment of the invention. The retention knob 16 includes a threaded end portion 50 that is capable of being threadingly received in the threaded aperture 44 at the tapered end portion 42 of the cutting head 14. In an alternate embodiment, the retention knob 16 is integrally-formed with the tapered end portion 42 of the cutting head 14. The opposite end of the retention knob 16 includes a generally spherical end portion 52 having a radius 57. The end portion 52 may also include a tool access 52a that is capable of receiving a tool (not shown) for assisting in threading the retention knob 16 into the cutting head 14. In the illustrated embodiment, the tool access 52a is hexagonal in shape. However, the invention can be practiced with other desirable tool access shapes that are known in the art. The end portion 52 includes an upper spherical clamp surface 51, a lower spherical clamp surface 53, and a lower spherical release surface 55. The clamp surfaces 51, 53 are located in the forward hemisphere with respect to a central axis 17 of the end portion 52. The lower spherical release surface 55 is located in the rearward hemisphere with respect to a central axis 17 of the end portion 52. The outer surface of the end portion 52 also includes a clearance diameter 52b that allows the retention knob 16 to be easily removed from the ball clamping mechanism 20 when the tool holder 10 is in the unlocked position.

The retention knob 16 also includes a middle portion 54 having an abutment face 54a that abuts an end face 42a of the cutting head 14 when the retention knob 16 is threadingly received in the threaded aperture 44 of the cutting head 14. It should be noted that a central, longitudinal axis 56 of the retention knob 16 is substantially aligned with the central, longitudinal axis 46 of the cutting head 14 when the retention knob 16 is attached to or integrally-formed with the cutting head 14.

The upper clamp 22 of the ball clamping mechanism 20 is shown in FIGS. 12-16. The upper clamp 22 includes a curved top surface 56 and a substantially planar bottom surface 58. As seen in FIG. 13, the top surface 56 is generally elliptical in shape similar to the aperture 34 of the body 12 to be snugly fit therein. A threaded aperture 60 extends from the top surface 56 to a passage 62 that extends to the bottom surface 58. The threaded aperture 60 is capable of threadingly receiving one end of the double-ended clamp screw 26. The upper clamp 22 includes a curved side surface 64 extending between the top surface 56 and the bottom surface 58. A dish-shaped seating surface 66 is formed at the intersection between the top surface 56 and the side surface 64 that engages the flat head screw 18 to prevent further radial movement of the upper clamp 22 when placing the tool holder 10 in the unlocked position. As seen in FIGS. 12 and 16, a portion of the upper clamp 22 includes a generally L-shaped cutout section 68 defined by an upper wall 70 and a side wall 72 that is generally perpendicular to the upper wall 70. The L-shaped cutout section 68 is capable of receiving a portion of the lower clamp 24. A generally cylindrical upper clamp release surface 75 is formed in the side wall 72 that engages the spherical release surface 55 of the retention knob 16 when placing the tool holder 10 in the unlocked position. A cavity 74 is formed in the cutout section 68 that is capable of receiving the end portion 52 of the retention knob 16. Specifically, the cavity 74 includes a generally spherical upper clamp cavity portion 74a and a generally cylindrical upper clamp cavity portion 74b. The generally spherical upper clamp cavity portion 74a is formed having a radius 77 that is slightly larger than the radius 57 of the generally spherical end portion 52 of the retention knob 16. For example, the radius 77 may be up to about 0.010 inches larger than the radius 57 of the end portion 52 of the retention knob 16. A portion of the wall of the generally cylindrical upper clamp cavity portion 74b defines a generally cylindrical upper clamp surface 76 that engages the upper spherical clamp surface 51 of the retention knob 16 when the tool holder 10 is placed in the locked position.

The lower clamp 24 of the ball clamping mechanism 20 is shown in FIGS. 17-21. The lower clamp 24 includes a curved bottom surface 78 and a substantially planar top surface 80. As seen in FIG. 18, the bottom surface 78 is generally elliptical in shape similar to the aperture 34 of the body 12 to be snugly fit therein. A threaded aperture 82 extends from the bottom surface 78 to the top surface 80. The threaded aperture 82 is capable of threadingly receiving one end of the double-ended clamp screw 26. The lower clamp 24 includes a curved side surface 84 extending between the bottom surface 78 and the top surface 80. A dish-shaped seating surface 86 is formed at the intersection between the bottom surface 78 and the side surface 84 that engages the flat head screw 18 to prevent further radial movement of the lower clamp 24 when placing the tool holder 10 in the unlocked position. As seen in FIGS. 17 and 21, a portion of the lower clamp 24 includes a generally L-shaped cutout section 88 defined by an upper wall 90 and a side wall 92 that is generally perpendicular to the upper wall 90. The L-shaped cutout section 88 is capable of receiving a portion of the upper clamp 22. A cavity 94 is formed in the cutout section 88 that is capable of receiving the generally spherical end portion 52 of the retention knob 16. Specifically, the cavity 94 includes a generally spherical lower clamp cavity portion 94a and a generally cylindrical lower clamp cavity portion 94b. Similar to the upper clamp 22, the generally spherical lower clamp cavity portion 94a of the lower clamp 24 is formed having a radius 97 that is slightly larger than the radius 57 of the end portion 52 of the retention knob 16. For example, the radius 97 may be up to about 0.010 inches larger than the radius 57 of the end portion 52 of the retention knob 16. A portion of the wall of the generally cylindrical lower clamp cavity portion 94b defines a generally cylindrical lower clamp surface 96 that engages the lower spherical clamp surface 55 of the retention knob 16 when the tool holder 10 is placed in the locked position.

Figure 22:
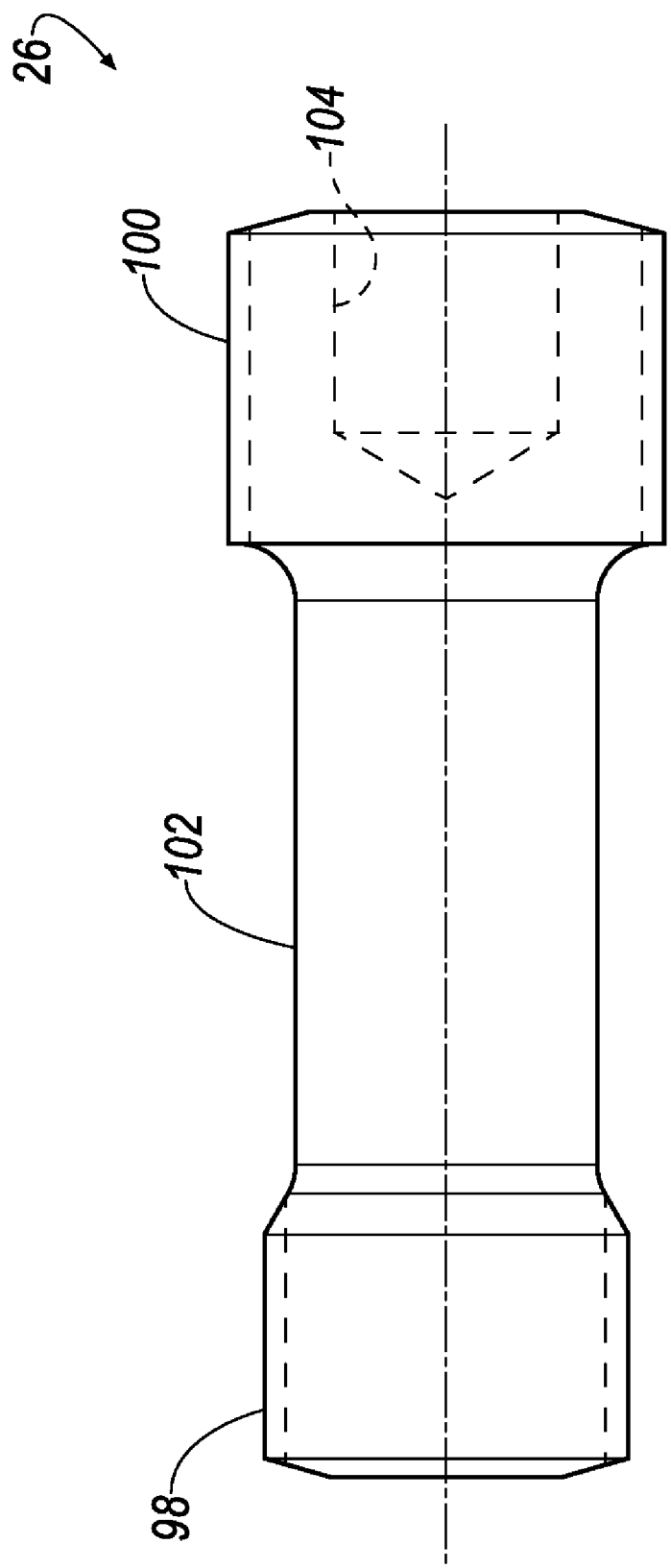
FIG. 22 is a side view of a double-ended clamp screw of the tool holder of FIG. 1 according to an embodiment of the invention.

Referring now to FIG. 22, the double-ended clamp screw 26 is shown according to an embodiment of the invention. The clamp screw 26 is generally cylindrical in shape and includes a first end portion 98, a second end portion 100 and a middle portion 102 between the first and second end portions 98, 100. The outer surface of the first end portion 98 is threaded, for example, with right hand threads, while the outer surface of the second end portion 100 is threaded, for example, with left hand threads. The first and second end portions 98, 100 are capable of being threaded into the threaded apertures 60, 82 of the upper and lower clamps 22, 24, respectively. In the illustrated embodiment, the first end portion 98 has a slightly smaller diameter than the second end portion 100, and the middle portion 102 has a smaller diameter than both the first and second end portions 98, 100. However, the invention can be practiced with the first and second end portions 98, 100 having approximately the same diameter. One of the end portions, for example, the second end portion 100 includes a tool access 104 for allowing a tool to be inserted therein. In the illustrated embodiment, the tool access 104 is hexagonal in shape.

To assemble the tool holder 10, the retention knob 16 is threaded onto the cutting head 14. The retention knob 16 can be threaded onto the cutting head 14 at any time during the assembly process. In an alternate embodiment, the retention knob 16 is integrally-formed with the cutting head 14. In this embodiment, the retention knob 16 does not need to be threaded onto the cutting head 14. The clamping assembly 20 is assembled by threading the double-ended clamp screw 26 into the threaded apertures 60, 82 of the upper and lower clamps 22, 24, respectively. Then, the clamping assembly 20 is inserted into the aperture 34 of the body. The flat head screws 18 are then threaded into the screw apertures 36 to limit radial movement of the clamping mechanism 20 and to secure the clamping mechanism 20 in the body 12.

In operation, the double-ended clamp screw 26 can be rotated in a counter-clockwise direction to move the tool holder 10 from the locked position to the unlocked position. During rotation of the clamp screw 26, the generally cylindrical release surface 75 formed in the side wall 72 of the upper clamp 22 engages the spherical release surface 55 of the retention knob 16 to cause the lower clamp 24 to contact the radial stop 18. Further rotation causes the cylindrical release surface 75 of the upper clamp 22 to act on the spherical release surface 55 of the retention knob 16 to cause the cutting head 14 to be released from the tool holder body 12. At this point, the tool holder 10 is in the unlocked position. To place the tool holder 10 in the locked position, the double-ended clamp screw 26 can be rotated in a clockwise direction to cause the upper and lower clamps 22, 24 to move toward each other until the generally cylindrical upper and lower clamp surfaces 76, 96 of the upper and lower clamps, 22, 24 engage the upper and lower spherical clamp surfaces 51, 55 of the end portion 52 of the retention knob 16. The generally cylindrical upper and lower contact surfaces 76, 96 elastically deform during the engagement with the generally spherical clamp surfaces 51, 55 of the retention knob 16 to form a lenticular contact area and securely hold the cutting head 14 in face contact with the body 12.

Figure 3:
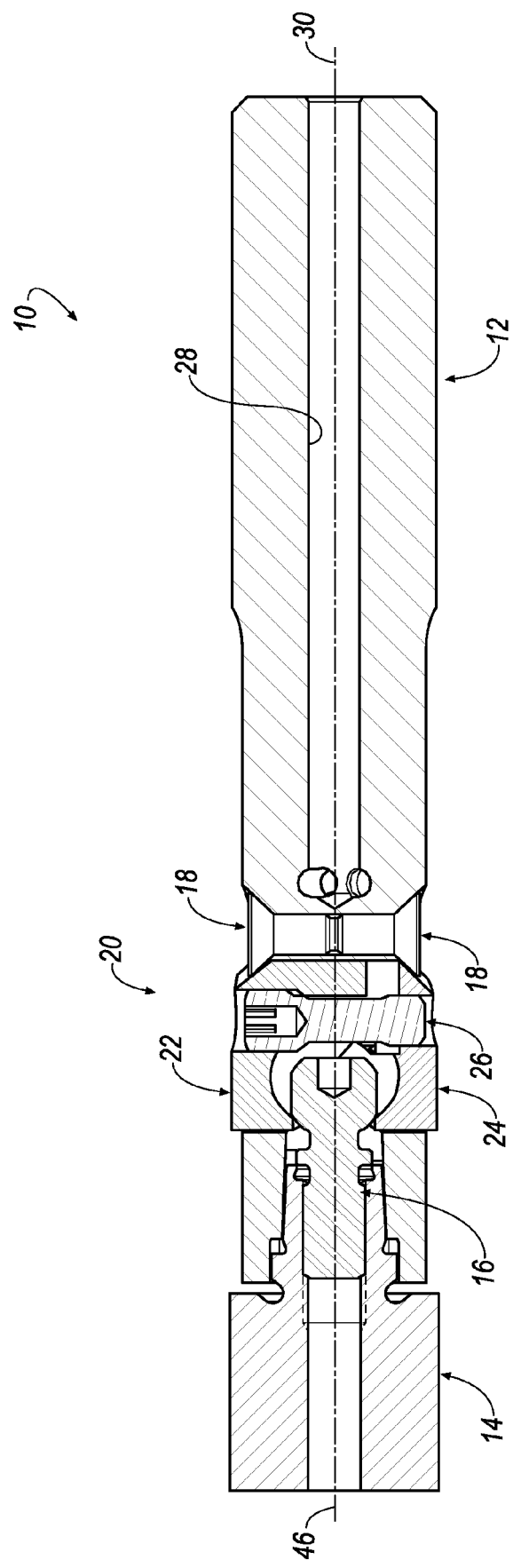
FIG. 3 is a cross-sectional view of the tool holder with the ball clamping mechanism of FIG. 1 in the unlocked position.
Figure 4:
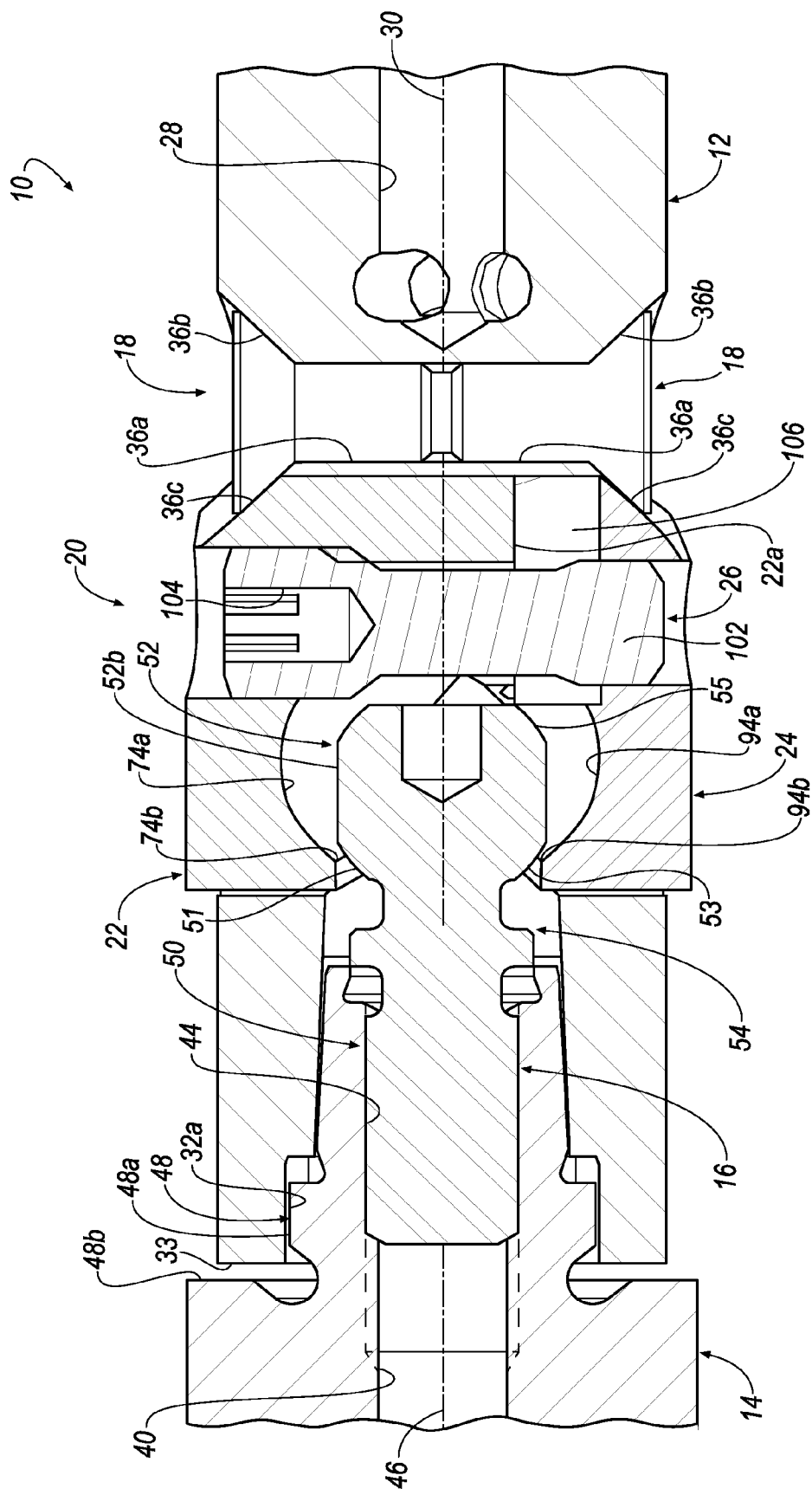
FIG. 4 is an enlarged view of the ball clamping mechanism of FIG. 3 in the unlocked position.

It is noted that the cutting head 14 and the retention knob 16 are drawn into the body 12 slightly in the direction of the longitudinal axis 30 of the body 12 when the tool holder 10 is placed in the locked position, as indicated by the double-arrow shown in FIGS. 1 and 3. This may cause the upper and lower clamps 22, 24 to become slightly non-parallel with respect to each other (and to the longitudinal axis 30 of the body 12), and the double-ended clamp screw 26 to become seized when the tool holder 10 is placed in the unlocked position.

Figure 24:
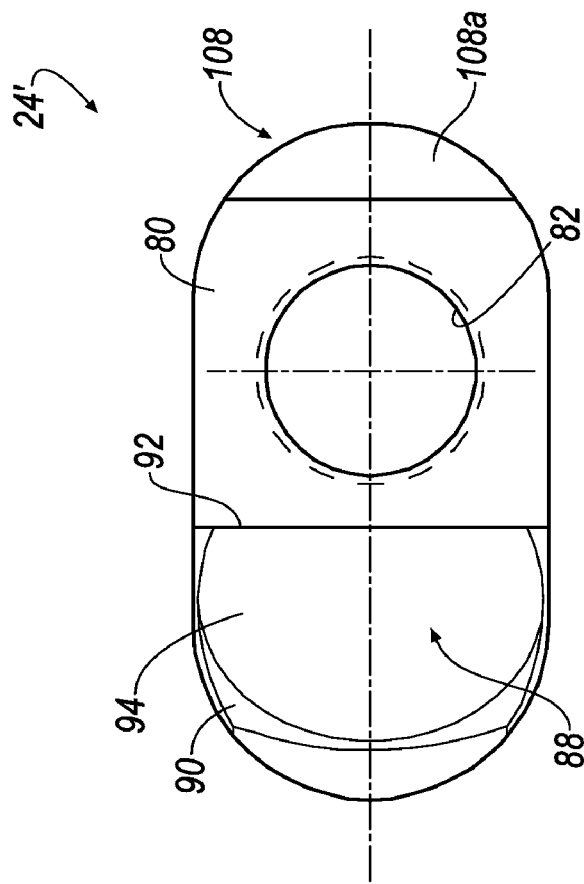
FIG. 24 is a top view of the lower clamp of FIG. 23.
Figure 23:
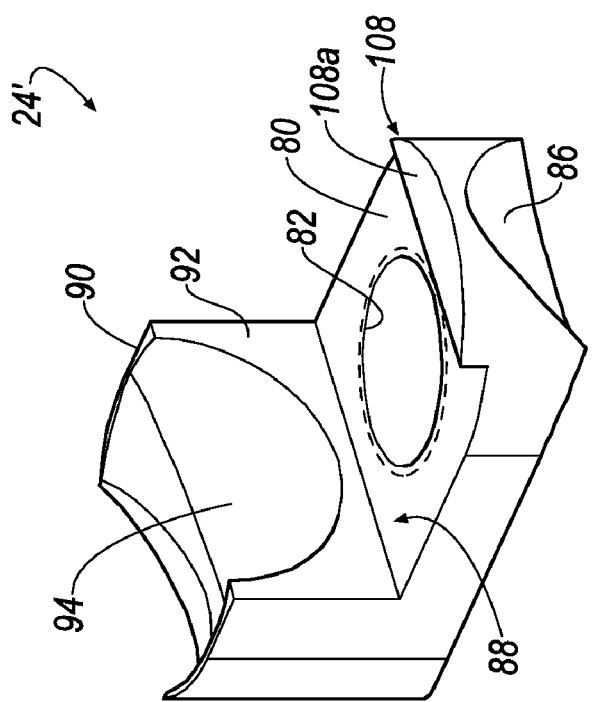
FIG. 23 is a perspective of a lower clamp according to an alternate embodiment of the invention.

As shown in FIG. 2, a gap 106 exists between the upper and lower clamps 22, 24 when the tool holder 10 is placed in the locked position. To help overcome the potential seizure of the double-ended clamp screw 26, a lower clamp 24' is shown in FIGS. 23 and 24 according to an alternative embodiment. The lower clamp 24' is substantially identical to the lower clamp 24, except that the lower clamp 24' includes a step 108 opposite the screw seating surface 86. The step 108 substantially fills the gap 106 such that a top surface 108a of the step 108 contacts the lower surface of the upper clamp 22 to help maintain the upper and lower clamps 22, 24' to be substantially parallel to each other (and to the longitudinal axis 30 of the body 12) when the tool holder 10 is placed in the locked position.

Another embodiment to maintain the upper and lower clamps in a substantially parallel orientation incorporates an extension of the rear portions of the upper and lower clamps in an axial direction. This extension or tab cooperates with a ledge on each side of the body to provide a radial stop for the rear of the clamp. This embodiment replaces the step 108 of the previous embodiment. The location of the radial stop is designed to keep the clamps substantially parallel when the clamps are in the locked position.

In the earlier embodiments, the retention knob 16 is located forward of the double-ended clamp screw 26 of the clamping mechanism 20, as shown in FIGS. 1-4. However, it is noted that the clamp surfaces 51, 53 are located in the forward hemisphere with respect to the central axis 17 of the end portion 52 of the retention knob 16. Therefore, it may be advantageous to position the double-ended clamp screw 26 more forward with respect to the retention knob 16 and the upper and lower clamp surfaces 76, 96 to cause the clamping force of the upper and lower clamps 22, 24 onto the retention knob 16 to be more radial and less axial.

Referring now to FIGS. 25 and 26, a tool holder 10' is shown according to an alternative embodiment of the invention. For brevity, the reference numbers of similar elements of the tool holder 10 are increased by 100 in the tool holder 10' and will not be explained in detail.

The tool holder 10' includes a generally cylindrical, annular body 112, a cutting head 114, a retention knob 116, a pair of flat head screws 118, and a ball clamping mechanism, shown generally at 120. The ball clamping mechanism 120 includes an upper clamp 122, a lower clamp 124 and a double-ended clamp screw 126. In FIG. 25, the tool holder 10' is shown in the locked position, and in FIG. 26, the tool holder 10' is shown in the unlocked position.

In this embodiment, a middle portion 202 of the double-ended clamp screw 126 is disposed within a slot 117 in the end portion 152 of the retention knob 116 in the embodiment of the tool holder 10' shown in FIGS. 25 and 26. By this arrangement, the double-ended clamp screw 126 is positioned more forward with respect to the clamp surfaces 51, 52. In addition, the middle portion 202 of the clamp screw 126 acts as an anti-rotation feature of the tool holder 10' and prevents rotation of the cutting head 114 with respect to the body 112. Thus, the flats 48b on the cutting head 14 of the embodiment shown in FIGS. 1-22 are not needed in the embodiment shown in FIGS. 25 and 26. In this embodiment, it is also noted that the cutting head 114 is integrally-formed with the retention knob 116. However, it will be appreciated that the integrally-formed cutting head/retention knob can also be used in the earlier embodiments.

As described above, the tool holder 10, 10' of the invention provides a tool holder with a ball clamp mechanism that is simple and cost-effective design, but holds the cutting tool securely in place with face contact between the cutting head and the body of the tool holder.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A tool holder, comprising:
   a body having a ball clamping mechanism aperture;
   a cutting head having a cutting end portion, a tapered end portion, and a middle portion located between the cutting end and the tapered end portion;
   a retention knob located at the tapered end portion of the cutting head, the retention knob including a generally spherical end portion at least partially disposed within the body, the generally spherical end portion including an upper spherical clamp surface and a lower spherical clamp surface; and
   a ball clamping mechanism received in the ball clamping mechanism aperture of the body, the ball clamping mechanism comprising:
   an upper clamp having an upper clamp cavity capable of receiving the generally spherical end portion of the retention knob, the upper clamp cavity including a generally spherical upper clamp cavity portion and a generally cylindrical upper clamp cavity portion, a portion of the generally cylindrical upper clamp cavity portion defining a generally cylindrical upper clamp surface;

a lower clamp having a lower clamp cavity capable of receiving the generally spherical end portion of the retention knob, the lower clamp cavity including a generally spherical lower clamp cavity portion and a generally cylindrical lower clamp cavity portion, a portion of the generally cylindrical lower clamp cavity portion defining a generally cylindrical lower clamp surface; and a double-ended clamp screw for threadingly receiving the upper and lower clamps, wherein rotation of the double-ended clamp screw in a first direction causes the generally cylindrical upper and lower clamp surfaces of the upper and lower clamps to move toward each other and engage the generally spherical upper and lower spherical clamp surfaces of the retention knob, respectively, and wherein the generally cylindrical upper and lower contact surfaces elastically deform during engagement with the generally spherical upper and lower clamp surfaces of the retention knob to form a lenticular contact area and securely hold the cutting head in face contact with the body and place the tool holder in a locked position.

2. A tool holder according to claim 1, wherein the upper clamp further includes a generally cylindrical release surface, and wherein the generally spherical end portion of the retention knob further includes a generally spherical release surface, and wherein the generally cylindrical release surface of the upper clamp engages the generally spherical release surface of the retention knob when the double-ended clamp screw is rotated in a second, opposite direction to cause the upper and lower clamps to move away from each other and place the tool holder in an unlocked position.

3. A tool holder according to claim 1, wherein the body further comprises a pair of threaded screw apertures capable of receiving stops that limit radial movement of the upper and lower clamps.

4. A tool holder according to claim 1, wherein the ball clamp mechanism aperture is substantially perpendicular to a longitudinal axis of the body.

5. A tool holder according to claim 1, wherein the lower clamp includes a step having a surface that engages a surface of the upper clamp for maintaining a substantially parallel relationship between the upper and lower clamps when the tool holder is placed in the locked position.

6. A tool holder according to claim 1, wherein the body includes a cutting head receiving receptacle for receiving the cutting head and the retention knob, and wherein the cutting head receiving receptacle has an included angle of about 5 degrees, 44 minutes.

7. A tool holder according to claim 6, wherein the cutting head includes an end portion having an outer surface having a taper angle approximately equal to the taper angle of the cutting head receiving receptacle.

8. A tool holder according to claim 1, wherein the body further includes a flange contact surface, and wherein the cutting head further includes a face contact surface that contacts the flange contact surface of the body when the tool holder is in the locked position.

9. A tool holder according to claim 1, wherein the tool holder further includes an anti-rotation feature for preventing rotation of the cutting head with respect to the body.

10. A tool holder according to claim 9, wherein the anti-rotation feature comprises two or more flats on the cutting head that interact with a wall of the cutting head receiving receptacle of the body to prevent rotation of the cutting head with respect to the body.

11. A tool holder according to claim 9, wherein the anti-rotation feature comprises the double-ended clamp screw having a middle portion disposed within a slot in the retention knob.

12. A tool holder according to claim 1, wherein a radius of the upper and lower clamp cavities of the upper and lower clamps is larger than a radius of the spherical end portion of the retention knob.

13. A tool holder, comprising:

a body having a ball clamping mechanism aperture;

a cutting head having a cutting end portion, a tapered end portion, and a middle portion located between the cutting end and the tapered end portion;

a retention knob located at the tapered end portion of the cutting head, the retention knob including a generally spherical end portion at least partially disposed within the body, the generally spherical end portion including a slot, an upper spherical clamp surface and a lower spherical clamp surface; and a ball clamping mechanism received in the ball clamping mechanism aperture of the body, the ball clamping mechanism comprising:

an upper clamp having an upper clamp cavity capable of receiving the generally spherical end portion of the retention knob, the upper clamp cavity including a generally spherical upper clamp cavity portion and a generally cylindrical upper clamp cavity portion, a portion of the generally cylindrical upper clamp cavity portion defining a generally cylindrical upper clamp surface;

a lower clamp having a lower clamp cavity capable of receiving the generally spherical end portion of the retention knob, the lower clamp cavity including a generally spherical lower clamp cavity portion and a generally cylindrical lower clamp cavity portion, a portion of the generally cylindrical lower clamp cavity portion defining a generally cylindrical lower clamp surface; and a double-ended clamp screw for threadingly receiving the upper and lower clamps, the double-ended clamp screw including a middle portion disposed within the slot of the retention knob, wherein rotation of the double-ended clamp screw in a first direction causes the generally cylindrical upper and lower clamp surfaces of the upper and lower clamps to move toward each other and engage the generally spherical upper and lower spherical clamp surfaces of the retention knob, respectively, and wherein the generally cylindrical upper and lower contact surfaces elastically deform during engagement with the generally spherical upper and lower clamp surfaces of the retention knob to form a lenticular contact area and securely hold the cutting head in face contact with the body and place the tool holder in a locked position.

14. A tool holder according to claim 13, wherein the upper clamp further includes a generally cylindrical release surface, and wherein the generally spherical end portion of the retention knob further includes a generally spherical release surface, and wherein the generally cylindrical release surface of the upper clamp engages the generally spherical release surface of the retention knob when the double-ended clamp screw is rotated in a second, opposite direction to cause the upper and lower clamps to move away from each other and place the tool holder in an unlocked position.

15. A tool holder according to claim 13, wherein the body further comprises a pair of threaded screw apertures capable of receiving stops that limit radial movement of the upper and lower clamps.

16. A tool holder according to claim 13, wherein the lower clamp includes a step for maintaining a substantially parallel relationship between the upper and lower clamps when the tool holder is placed in the locked position.

17. A tool holder according to claim 13, wherein the body includes a cutting head receiving receptacle for receiving the cutting head and the retention knob, and wherein the cutting head receiving receptacle has an included angle of about 5 degrees, 44 minutes.

18. A tool holder according to claim 17, wherein the cutting head includes an end portion having an outer surface having a taper angle approximately equal to the taper angle of the cutting head receiving receptacle.

19. A tool holder according to claim 13, wherein the body further includes a flange contact surface, and wherein the cutting head further includes a face contact surface that contacts the flange contact surface of the body when the tool holder is in the locked position.

* * * * *

UNITED STATES PATENT AND TRADEMARK OFFICE
CERTIFICATE OF CORRECTION

PATENT NO. : 8,033,766 B2
APPLICATION NO. : 12/118048
DATED : October 11, 2011
INVENTOR(S) : Robert A. Erickson It is certified that error appears in the above-identified patent and that said Letters Patent is hereby corrected as shown below:

IN THE SPECIFICATION
In Column 1, Line 12, delete "frustro-conical" and insert -- frusto-conical --, therefor.

In Column 1, Line 13, delete "frustro-conical" and insert -- frusto-conical --, therefor.

In Column 1, Lines 15-16, delete "frustro-conical" and insert -- frusto-conical --, therefor.

In Column 1, Line 22, delete "frustro-conical" and insert -- frusto-conical --, therefor.

In Column 1, Line 28, delete "frustro-conical" and insert -- frusto-conical --, therefor.

In Column 1, Lines 28-29, delete "frustro-conical" and insert -- frusto-conical --, therefor.

In Column 1, Line 34, delete "frustro-conical" and insert -- frusto-conical --, therefor.

In Column 1, Line 36, delete "frustro-conically" and insert -- frusto-conically --, therefor.

In Column 2, Line 14, delete "contact" and insert -- clamp --, therefor.

In Column 2, Line 55, delete "contact" and insert -- clamp --, therefor.

In Column 3, Line 47, delete "position;" and insert -- position. --, therefor.

In Column 7, Line 28, delete "contact" and insert -- clamp --, therefor.

IN THE CLAIMS
In Column 9, Line 23, in Claim 1, delete "contact" and insert -- clamp --, therefor.

In Column 10, Line 54, in Claim 13, delete "contact" and insert -- clamp --, therefor.

Signed and Sealed this
Thirtieth Day of April, 2013

Teresa Stanek Rea
*Acting Director of the United States Patent and Trademark Office*